May 19, 1970
R. T. CLARK
3,512,998
METHOD AND APPARATUS FOR CONTINUOUS
STERILIZATION OF LIQUIDS
Filed Sept. 26, 1967
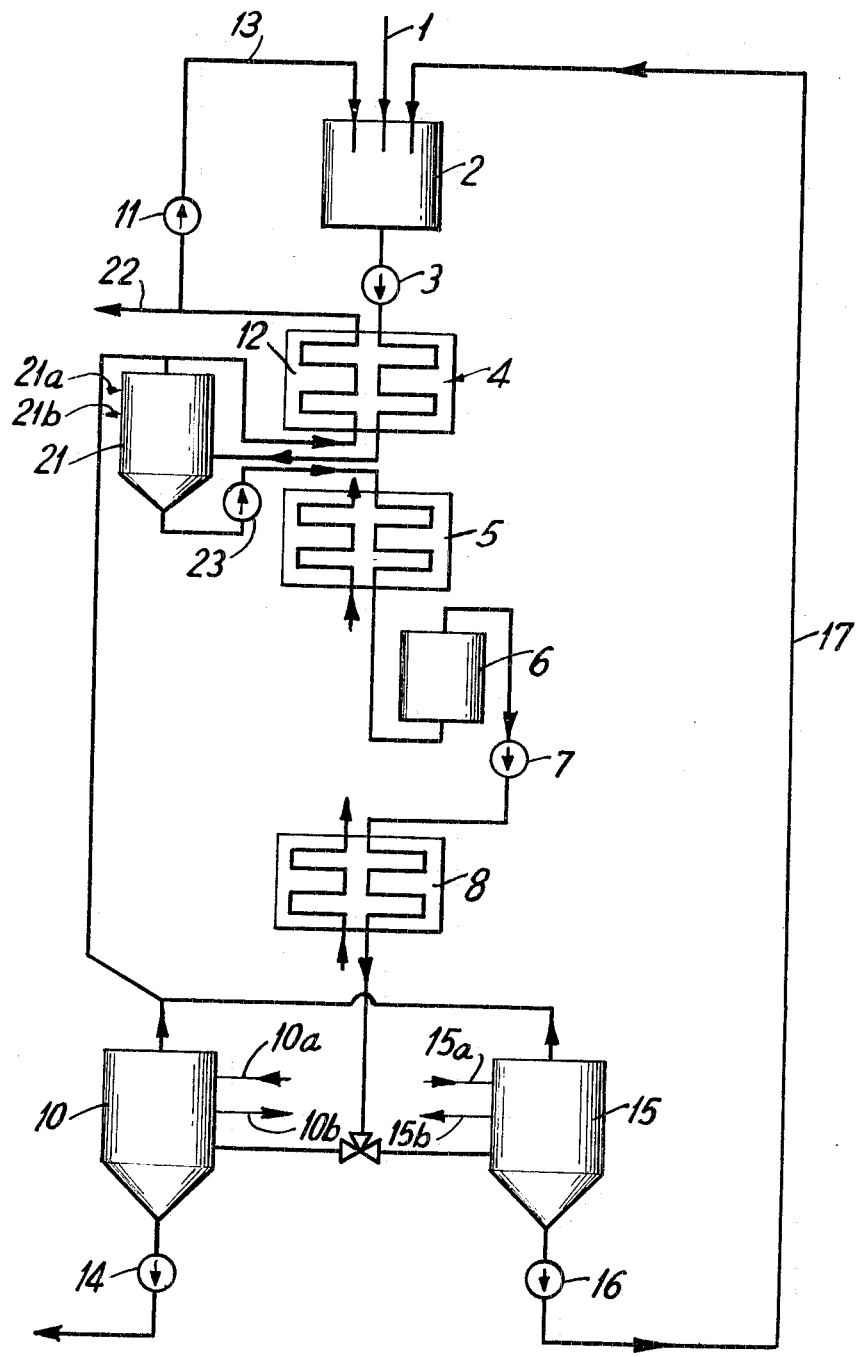
INVENTOR.
REGINALD THOMAS CLARK
BY
Davis, Hopie, Faithfull & Hapgood
ATTORNEYS United States Patent Office 3,512,998
Patented May 19, 1970

3,512,998
METHOD AND APPARATUS FOR CONTINUOUS STERILIZATION OF LIQUIDS
Reginald Thomas Clark, Staines Middlesex, England, assignor to Alfa-Laval AB, Tumba, Sweden, a corporation of Sweden
Continuation-in-part of applications Ser. No. 497,223, Oct. 18, 1965, and Ser. No. 640,740, May 23, 1967. This application Sept. 26, 1967, Ser. No. 670,632
Claims priority, application Great Britain, Sept. 27, 1966, 43,106/66
Int. Cl. A23c 3/00, 9/00; A23l 3/00
U.S. Cl. 99—212                                4 Claims

ABSTRACT OF THE DISCLOSURE

The liquid to be sterilized is first preheated by indirect heating and is then rapidly heated under pressure to sterilization temperature, also by indirect heating. After at least partial preheating or after heating to sterilization temperature, the liquid is passed to a chamber at a pressure such that the liquid is cooled by evolution of vapor therefrom and is at least partially degassed, the evolved vapor then being condensed and returned to the liquid. The pressure in the aforesaid chamber is at least equal to atmospheric pressure but is lower than the pressure at which the liquid arrives at the chamber.

This invention relates to an improved method and apparatus for continuously sterilizing a liquid. The present application is a continuation-in-part of my copending U.S. application Ser. No. 640,740, filed May 23, 1967 (now abandoned), and a continuation-in-part of my copending application Ser. No. 497,223, filed Oct. 18, 1965.

The above-mentioned copending application Ser. No. 497,223 discloses a method of continuous sterilization comprising the steps of preheating the liquid by indirect heating, rapidly heating the liquid under pressure to sterilization temperature by indirect heating, then as soon as sterilization is complete, passing the liquid to a vessel maintained at a subatmospheric pressure such that the liquid boils, whereby the liquid is cooled by evolution of vapor therefrom, and condensing the evolved vapor and returning the condensate to the liquid upstream from the point where the latter is heated to sterilization temperature.

As stated in said copending application Ser. No. 497,223, the development of sterilization methods has passed from indirect sterilization to various methods of sterilization utilizing direct injection of live-steam for heating the liquid to be sterilized to the sterilizing temperature, and it was also pointed out that the latter methods have certain drawbacks. The original method of heating indirectly was abandoned, as it caused "burning on" on the hot heat exchange plates and gave a burnt taste to the sterilized milk.

According to the copending application Ser. No. 497,223, it was found that this method of indirect heating can be used to advantage if the heating is performed by preheating to a moderate temperature in one step, followed by very quick heating to the sterilizing temperature in a second step and by an equivalently quick cooling after the sterilization. In that connection, it was found advantageous to return, to a point upstream from the sterilizing point of the system, the condensate obtained by condensing the steam evolved in connection with the evaporative cooling after sterilization. The reason for this is that the milk thus diluted by means of the condensate has a reduced tendency to "burn on" upon the hot heat exchange plates used in the second heating step for heating to the sterilizing temperature.

In attempting further development of the method according to the above-mentioned copending application Ser. No. 497,223, unexpected findings resulted; and my copending application Ser. No. 640,740 relates to improvements stemming from those findings.

According to said copending application Ser. No. 640,740, the milk is at least partially degassed before it reaches the second heating step (the sterilizing step). The reason for this is the finding that gases dissolved or otherwise contained in the milk expand to form small or large bubbles of gas, when heated to the high temperature of the second heating step. These gas bubbles form pockets in the sterilizing heat exchanger, and in such pockets the milk forms only a thin layer on the hot surfaces of the heat exchanger, so that in such places there will temporarily be no substantial flow of milk that will absorb the heat from the hot surfaces and thus prevent the "burning on." The aforesaid thin layer of milk cannot absorb the heat at the rate necessary to prevent "burning on" and therefore has a marked tendency to "burn on." Thus it is now apparent that at least partial degassing before heating to sterilization temperature will prevent or at least greatly reduce the development of these gas bubbles and pockets.

Indeed, it has been found that if the gas is expelled from the milk before sterilization, it is by no means necessary to lead the condensed steam originating from the evaporative cooling vessel back to a point of the system upstream of the sterilization point. On the contrary, it has been found that the condensate can be returned to the milk in the vessel used for the evaporative cooling. It is quite obvious that if the condensate can be returned to the milk in the evaporative cooling vessel, the system can be made substantially simpler and manufactured at a lower cost. Preferably, the steam evolved in connection with the evaporative cooling is condensed on a condenser that is built into the evacuated evaporative cooling vessel.

The step of passing the liquid after heating to a vessel at subatmospheric pressure is important not only in quickly reducing the temperature of the liquid but in effecting partial degassing. This is particularly important in the case, for example, of milk, in which an excess of gas in the milk will cause "burning on" on the hot heat exchanger surfaces, as has been clearly explained in said patent application Ser. No. 640,740. It has proved important also in such cases, for instance in the case of milk, in which an excess of oxygen in the sterilized product will result in the onset of flavor deterioration.

The present invention is concerned with achieving the same effect of at least partial degassing by evaporative cooling, but it modifies the processes and apparatus described and claimed in the above-mentioned copending applications in that the cooling and degassing are carried out in a vessel maintained at a pressure which is equal to or higher than atmospheric pressure but lower than the pressure at which the liquid arrives at the vessel.

The invention will be more fully understood from the following description of preferred embodiments thereof, given by way of example, with reference to the accompanying drawing, in which the single illustration is a schematic view of a system according to the invention.

Milk to be sterilized is continuously fed along a line 1 to a container 2 from which it is pumped, by means of a pump 3, to sections 4 and 5 of a heat exchanger. In this heat exchanger, which may be of the plate type, the milk is indirectly heated to a temperature in the order of 180° F. (80–85° C.). Thereafter, the heated milk is led into a holding vessel 6 where its protein content is stabilized. The milk is then passed under pressure by a pump 7 into the section 8 of a second heat exchanger, which again may be of the plate type. In this heat exchanger, the milk may be indirectly heated to a sterilization temperature in the order of 280° F., under a pressure such that the milk does not boil, for example, a pressure of 60 pounds per square inch gauge (p.s.i.g.).

It is desirable to hold the milk at the sterilizing temperature for the minimum time necessary for the required degree of sterilization to take place, since the milk suffers a flavor loss at high temperature, and the longer the milk is maintained under such temperature, the greater the loss of flavor. Therefore, in order to preserve the quality of the milk, its temperature should be reduced as quickly as possible once sterilization has been effected. Such rapid cooling is obtained by passing the milk from the heating section 8 through a multiple-way valve 9 into an expansion vessel 10 or 15 which, by means of a pipe line 22 leading to a discharge pump (not shown), is held under such a pressure, lower than that in section 8 but equal to or higher than atmospheric pressure, that the milk immediately boils and in so doing cools, since some of its latent heat is used in the formation of steam. The liquid milk is withdrawn from the bottom of expansion vessel 10 by a pump 14.

The vessel 10 may be maintained at a pressure of 10 p.s.i.g. as compared to 60 p.s.i.g. in section 8, so that the milk is cooled to a temperature of 240° F. in vessel 10 by evaporative cooling. Boiling of the milk under reduced pressure in the vacuum vessel 10 is accompanied by degassification, that is, the removal of at least a part of the gases, such as oxygen, dissolved in the milk. It has been found that this degassification considerably retards the development of off-flavor in the sterilized product. The use of evaporative cooling in the process according to the invention therefore provides two important advantages. First, it enables the milk to be cooled very rapidly from sterilization temperature, thus enabling sterilized milk to be obtained which does not have the burnt off-flavor associated with prior processes. In addition, the degassification associated with evaporative cooling considerably extends the shelf-life of the sterilized product.

Evaporation in the expansion vessel 10 reduces the water content of the milk and, therefore, in the process so far described, the constitution of the milk would be changed which is, of course, unsatisfactory. To compensate for this water loss, the steam and gas exhausted from the vessel 10 are, according to the invention, passed to a condenser from which the condensate is passed by way of a pump 11 and a pipe 13 to the container 2; and the non-condensible gases, such as oxygen, are exhausted to the atmosphere through the pipe line 22. In the embodiment illustrated, the condenser is a section 12 of the heat exchanger section 4, but a separate condenser can, of course, be used.

In one embodiment of the improved process, degassing of the milk is effected after partial preheating. For this purpose, the milk is passed from the output side of the heat exchanger section 4 to an expansion vessel 21 which is connected by line 22 to the discharge pump (not shown). The discharge line 22 maintains the reduced pressure in the vessel 21 at a value at least equal to atmospheric pressure but sufficiently low to cause the milk to boil at the temperature at which it is received from the heat exchanger section 4, this pressure preferably being such that the reduction in the temperature of the milk is at least 5° F. (2.8° C.). The degassed (and cooled) milk is returned from the vessel 21 to the heat exchanger section 5 by way of a pump 23. The steam and gas evolved in the vessel 21 are passed through the condenser 12 and the condensate is returned to the container 2, the non-condensible gases being exhausted to the atmosphere through the discharge line 22.

In a further embodiment according to the present invention, the vapor evolved in any one or more of the vessels 10, 15 and 21 is not exhausted from the vessel, condensed and returned to the milk upstream from the sterilization stage, but is condensed in situ by providing the vessel with internal and/or external cooling means (not shown) capable of condensing the vapor and returning the condensate to the liquid in the particular vessel. Where such internal cooling means are provided, the vessel is, of course, connected to the appropriate vacuum or discharge pump, but the separate condenser and the return pipe for the condensate are omitted. In addition to the possibility of both vessels 10 and 15 being provided with internal cooling means for effecting in situ condensation, it is also possible for one or more of these vessels to be provided with external cooling means, such as a plate type heat exchanger, the condensate being in any case returned to the liquid in the vessel in question.

As disclosed in the aforesaid copending application Ser. No. 497,223, milk is directed into the vessel 10 by the multiple-way valve 9 when the milk from heat exchanger section 8 is at the desired sterilizing temperature. If for some reason the milk has not been heated to the required temperature, then valve 9 is actuated to convey the milk into the vessel 15, from which the liquid milk is returned by pump 16 and pipe line 17 to the container 2.

When the vapor evolved in any of the vessels 10, 15 and 21 is to be condensed in situ in the vessel, this may be effected by condenser cooling means comprising a pipe for continuously supplying the cooling medium to the vessel and a pipe for continuously withdrawing the medium after its cooling action, such as pipes 10a and 10b, pipes 15a and 15b and pipes 21a and 21b associated with vessels 10, 15 and 21, respectively.

It will be apparent that once the milk has been quickly cooled and at least partially degassed as aforesaid, further cooling can then be effected by indirect cooling. It will also be apparent that the water vapor evolved during evaporation cooling may be returned to the liquid either at vessel 10 or at some other point in the system, in order to maintain the original water content of the milk or other liquid.

Although partial cooling may be carried out by indirect means prior to evaporation cooling in vessel 10, the above-described arrangement is usually preferable.

I claim:

1. In a continuous process for the sterilization of a liquid subject to flavor loss and/or adulteration when sterilized, the liquid being sterilized by preheating it through indirect heating, and thereafter rapidly heating the preheated liquid under pressure to sterilization temperature by indirect heating, the improvement which comprises passing the liquid, after at least partially effecting said preheating and before heating the liquid to said sterilization temperature, to an expansion chamber which is maintained at a pressure at least equal to atmospheric pressure but lower than the pressure at which the liquid is passed to said chamber, said chamber pressure being such that the liquid is cooled by evolution of vapor therefrom and is at least partially degassed, passing the liquid after sterilization to a second expansion chamber to evolve vapor from the liquid in the second chamber and thereby cool the liquid, condensing the vapors in said first and second chambers, and returning the resulting condensate to the liquid in said chambers.

2. A process according to claim 1 in which said second expansion chamber is maintained at a pressure at least equal to atmospheric but lower than the pressure at which the liquid is passed to said second chamber.

3. Apparatus for sterilizing liquids, which comprises a first indirect heating means for preheating the liquid, means for supplying the liquid to be sterilized to said first heating means, a second indirect heating means for rapidly heating the liquid under pressure to sterilization temperature, means forming a first expansion chamber for evolving vapor from the liquid and thereby rapidly cooling the liquid from said sterilization temperature, said supply means and said first and second heating means as well as said first expansion chamber being connected in series to form a flow line, a vessel interposed in said flow line between the first and second heating means and forming a second expansion chamber, means for maintaining said second expansion chamber at a pressure at least equal to atmospheric pressure but lower than the pressure at which the liquid is passed to said second chamber, whereby vapor is evolved in said second chamber, and means for condensing the vapors in said first and second chambers and returning the condensate to the liquid in said chambers.

4. Apparatus according to claim 3, comprising also means for maintaining said first expansion chamber at a pressure at least equal to atmospheric pressure but lower than the pressure at which the liquid is passed to said first chamber.

References Cited
UNITED STATES PATENTS

| | | | |
|---|---|---|---|
| 2,644,758 | 7/1953 | Cross | 99—212 |
| 2,975,069 | 3/1961 | Laguilharre | 99—212 X |
| 3,230,095 | 1/1966 | Stewart | 99—212 |
| 3,254,943 | 6/1966 | Palm | 99—212 X |

LIONEL M. SHAPIRO, Primary Examiner

D. M. NAFF, Assistant Examiner

U.S. Cl. X.R.

99—211, 215; 21—93